3,458,279
PROCESS FOR PREPARING SODIUM METAPHOSPHATE

Yoshito Yasutake and Yosisige Fujita, Yamaguchi-ken, Japan, assignors to Central Glass Co., Ltd., Yamaguchi-ken, Japan, a corporation of Japan
No Drawing. Filed Mar. 15, 1967, Ser. No. 623,209
Claims priority, application Japan, Mar. 31, 1966, 41/20,063
Int. Cl. C01b 25/30
U.S. Cl. 23—106                 4 Claims

ABSTRACT OF THE DISCLOSURE

A process for preparing highly pure sodium metaphosphate by adding ammonia and basic sodium salt(s) directly to wet process phosphoric acid, crystallizing sodium ammonium hydrogen phosphate which is commonly called microcosmic salt($NaNH_4HPO_4 \cdot 4H_2O$), thereafter condensing the separated crystals with heat while controlling the total sodium oxide ($Na_2O$) to the total phosphoric anhydride ($P_2O_5$) mol ratio to lie within the range of from 1 to 1.2:1 with or without the aid of basic sodium salt(s).

BACKGROUND OF THE INVENTION

Field of the invention

The present invention relates to a process for preparing highly pure and highly condensed sodium metaphosphate from wet process phosphoric acid.

Description of the prior art

Known process for preparing highly pure sodium metaphosphate from wet process phosphoric acid are represented by the method which comprises preliminary refining of wet process phosphoric acid containing various impurities with ion-exchange resin or by other suitable means, thereafter neutralizing the refined phosphoric acid with soda ash either by including or without including the step of removal of impurities from said refined phosphoric acid by adding various phosphoric acid refining agents before or after said neutralization, and subsequently dehydrating and condensing the resulting sodium dihydrogen phosphate by the application of heat. However, these prior methods invariably had the shortcomings and disadvantages that they had to use expensive ion-exchange resins and expensive refining agents and to repeat filtering several times in the refining of the wet process phosphoric acid, and also that it was difficult to completely remove impurities from the product by the mere repetition of this filtering operation alone.

There has also been proposed a method for recovering refined pure crystals from said sodium dihydrogen phosphate solution by conducting re-crystallization. However, this latter method had the following difficulties. Specifically, the low pH value of from 4.4 to 4.6 required in the crystallization led to incomplete removal of impurities. Besides, owing to the high solubility of sodium dihydrogen phosphate, it was necessary to concentrate this sodium dihydrogen phosphate solution, after it has been neutralized with basic sodium salts(s), in order to induce crystallization of said sodium dihydrogen phosphate. During this concentrating operation, there further developed such a large amount of precipitates that it was difficult to filter out the sodium dihydrogen phosphate, and the liquid had a glutinous phase, resulting in a tremendous difficulty in the separation of crystals therefrom.

SUMMARY OF THE INVENTION

After an extensive study to find an improved method for manufacturing sodium metaphosphate from wet process phosphoric acid free from the foregoing inconveniences, the inventors have suceeded in doing so by the employment of the following procedure as is shown by the formulas given below, i.e. by first neutralizing wet process phosphoric acid with ammonia and basic sodium salt(s), followed by a crystallization step to develop crystals of sodium ammonium hydrogen phosphate which is popularly called microcosmic salt ($NaNH_4HPO_4 \cdot 4H_2O$) followed by the step of separating said crystals, and then dissolving the resulting microcosmic salt in a small amount of heated water and distilling the solution to evaporate and expel ammonia therefrom, or distilling undiluted microcosmic salt containing water of crystallization to evaporate ammonia therefrom, or heating the undiluted microcosmic salt to perform deammoniation, dehydration and condensing all in one step:

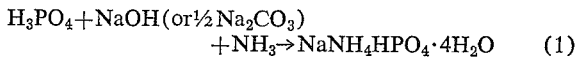

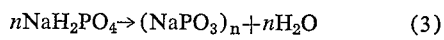

Specifically, the process of the present invention which includes this intermediary step of preparing microcosmic salt according to the Formula 1 is quite advantageous since it enables one to easily obtain highly pure and impurity-free crystals of sodium metaphosphate by the simple procedure of first neutralizing wet process phosphoric acid, then removing the precipitates of impurities such as iron, aluminium, fluorine and silica etc.; by a separation technique (this does not require the impurities to be completely separated in this stage) and thereafter crystallizing microcosmic salt from the remaining liquid.

While it is well known that crystallization is one of the most effective methods for the production of materials in general, the present invention is noteworthy in that it utilizes the overwhelmingly superior nature of the microcosmic salt toward the achievement of the objects of the present invention over other kinds of salts, and that by doing so, it has succeeded in greatly simplifying the industrial process of producing sodium metaphosphate from wet process phosphoric acid.

A description will now be made of the process of the present invention.

In the first step of the process of the present invention, wet process phosphoric acid is neutralized with ammonia until the pH value of the liquid reaches the ranges of 3.5 to 6.0. The ammonia which is used in this step may be in either gaseous form or liquid form. However, the entire process is markedly improved because the ammonia which is expelled during the step of distillation of microcosmic salt (this step will be described later) can be recovered and recycled. During the neutralization, phosphoric acid turns into boiling state because of the heat from neutralization, and it is to be noted that such state of phosphoric acid is desirable. If, however, this phosphoric acid is left to cool down, there will develop deposition of crystals of ammonium phosphate and, therefore, care must be taken so as to avoid the occurrence of any lowering of the temperature of the phosphoric acid. As a result of this neutralization, a majority of the impurities such as iron, aluminium and silica etc.; which are contained in the wet process phosphoric acid will deposit in the form of precipitates, which are then separated by filtering or sedimentation techniques. The filtered liquid after separation of precipitates may still contain some fine precipitates suspended therein. To the filtered liquid consisting chiefly of the separated ammonium dihydrogen phosphate (NH$_4$H$_2$PO$_4$)

is admixed with basic sodium salt(s) such as soda ash or caustic soda in an amount so that the basic sodium salt(s) (calculated as Na$_2$O) to the phosphoric acid (calculated as P$_2$O$_5$) mol ratio is in the range of 1 to 1.2:1 to cause a reaction therebetween, after which the mixture is cooled and crystals of microcosmic salt are deposited. The formed crystals are then separated and washed, and if necessary, they are further refined by the re-crystallization technique. The crystals of microcosmic salt thus obtained contain a negligible amount of impurities, and therefore, there is no need of including the step of refining phosphoric acid which is employed in the prior methods of preparing phosphates from wet process phosphoric acid. In view of the property of microcosmic salt that it is easily soluble in water at a high temperature and is poorly soluble at a low temperature, the adoption of performing crystallization at a low temperature affords an advantage that a large amount of microcosmic salt can be obtained with a good yield. In the second step of the process of the present invention, the microcosmic salt thus obtained is then separated and washed, and thereafter it is dissolved in a small amount of water and heated into a highly concentrated solution of microcosmic salt which is then distilled with heat to collect most of the ammonia so that the ammonia can be recycled to the previously described step of neutralizing wet process phosphoric acid. The liquid after ammonia has been distilled out consists of sodium dihydrogen phosphate solution containing a very small amount of residual ammonia. After ammonia has been distilled out, the remaining liquid may be subjected to drying, dehydration and calcination in a known manner to produce sodium metaphosphate. During said drying, dehydrating and calcining steps, the residual ammonia is evaporated completely so that there is found no trace of ammonia in the final product. The evaporated ammonia can be collected without loss by arranging so that it is absorbed by the feed stock wet process phosphoric acid.

In distilling a microcosmic salt solution, the Na$_2$O to P$_2$O$_5$ mol ratio would be 1:1 in case the distillation is performed without the aid of basic sodium salt(s). In industrial practice, however, the amount of ammonia that can be distilled out is about 60 to 70%. Therefore, by heat-distilling the microcosmic salt after admixing thereto basic sodium salt(s) in an amount lying within the range tolerable for the desired final product, the rate of distilled-out ammonia increases, and as the result, the amount of ammonia recovered in the subsequent drying and calcining steps is reduced. This is quite advantageous, because in some instances the ammonia evaporated in the drying and calcining steps may be discarded instead of being recovered, since the amount of lost ammonia is almost negligible. Also, instead of dissolving crystals of microcosmic salt in a small amount of water, their dehydration, ammonia-evaporation and condensation can be performed all in one step.

As has been described, the present invention requires no extra step of refining wet process phosphoric acid in the preparation of sodium metaphosphate therefrom, and makes it possible to manufacture sodium metaphosphate having a higher purity as compared with the prior method where this product is obtained by first converting wet process phosphoric acid to sodium dihydrogen phosphate.

DESCRIPTION OF THE PREFERRED EMBODIMENTS

The present invention will now be described in connection with some of the embodiments of the invention.

Example 1

To 300 parts of wet process phosphoric acid (P$_2$O$_5$ content being 30%) was added 68 parts of mother liquor (P$_2$O$_5$:15%, Na$_2$O:6.6%, and NH$_3$:7.4%) which had been separated from the crystallized microcosmic salt. The ammonia evaporated from distillation of the microcosmic salt was, as will be described later, made to be absorbed by the resulting mixture liquid, and at the same time fresh ammonia was supplied to this liquid while controlling the pH of this liquid so as to lie at 4.2. Due to the heat from neutralization, the temperature of this liquid rises up to the vicinity of boiling point, resulting in the deposition of colloidal precipitates consisting of such substances as iron phosphate, aluminium phosphate, fluorine and silica etc. These precipitates of impurities are then separated by a filter. Into the crude ammonium phosphate solution thus obtained was introduced 57 parts of soda ash (Na$_2$CO$_3$ content being 99%) while the solution was heated, thereby producing crude microcosmic salt. This microcosmic salt solution was supplied to a crystallizer where the solution was cooled down to 50° C., thereby highly pure microcosmic salt was crystallized. The slurry of produced microcosmic salt was then separated by a separator. The separated crystals of microcosmic salt were washed with 36 parts of water, thereby 189 parts of microcosmic salt were obtained. After a small amount of water was added to said crystals, the mixture was heated into a concentrated solution of microcosmic salt. The mother liquor separated from crystals still contained a considerable amount of microcosmic salt, and therefore, the majority portion of it was recycled by adding it to the fresh wet process phosphoric acid so as to improve the utility of P$_2$O$_5$. The concentrated microcosmic salt solution was supplied to a distilling vessel to perform separation of ammonia, to thereby concentrate the solution concurrently. The mixed gas of water vapor and ammonia exhausted from the top portion of the distilling vessel was introduced to the wet process phosphoric acid as has been previously stated so as to utilize the evaporated ammonia. The concentrated liquid (P$_2$O$_5$:43.5%, NH$_3$:3.6%) drained from the bottom of the distilling vessel, on the other hand, was sprayed into a calcining furnace held at 500° C. to perform drying, calcination and condensation in one step. As a result, 87 parts of granular product of sodium metaphosphate was obtained. The exhausted gas from the calcining furnace was introduced to the wet process phosphoric acid to recover and re-use the ammonia contained in said gas.

Example 2

To 150 parts of concentrated microcosmic salt solution (P$_2$O$_5$:22%) obtained from the treatment similar to that in Example 1 was added 72 parts of caustic soda, while controlling the Na$_2$O to P$_2$O$_5$ mol ratio to be held at approximately 1.2 to 1. Thereafter, this solution was supplied to a distilling vessel where the evaporated ammonia was recovered, and the liquid was concentrated concurrently. After having recovered 90% of the ammonia contained in the microcosmic salt, the resulting liquid was supplied to a spray-drying column held at 600° C. to whereby perform spray, calcination and condensation of this liquid, and 44 parts of granular sodium metaphosphate was obtained.

Example 3

189 parts of crystallized microcosmic salt obtained from the treatment similar to that in Example 1 was heated at 650° C. to melt in a crucible pot without the admixture of any other substances, and removal of ammonia, dehydration and condensation were performed in one step. As a result, 80 parts of sodium metaphosphate was obtained.

What is claimed is:
1. A process for preparing sodium metaphosphate, which comprises the steps of:
    adding ammonia to a wet process phosphoric acid solution containing impurities until the pH of the solution is in the range of 3.5 to 6.0 whereby there is obtained an ammonium phosphate solution;

then removing the major portion of the precipitates of impurities from the solution;

then adding to the ammonium phosphate solution a basic sodium salt selected from the group consisting of soda ash and caustic soda in a quantity such that the $Na_2O/P_2O_5$ mol ratio in the solution is in the range of about 1 to 1.2:1 so that microcosmic salt is formed and then cooling the solution to precipitate crystals of the microcosmic salt;

then separating the crystals of the microcosmic salt from the solution and washing said crystals with water;

then distilling out ammonia from said crystals of microcosmic salt to obtain highly pure sodium dihydrogen phosphate; and converting the sodium dihydrogen phosphate to sodium metaphosphate by dehydration and condensation.

2. A process for preparing sodium metaphosphate according to claim 1, in which during the step of distilling out ammonia from said crystals of microcosmic salt, there is also added to the crystals a basic sodium salt selected from the group consisting of soda ash and caustic soda so that the $Na_2O/P_2O_5$ mol ratio is maintained at a value ranging from 1:1 to 1.2:1.

3. A process for preparing sodium metaphosphate according to claim 1, in which the ammonia which is distilled out from the crystals of the microcosmic salt is recycled and is added to the wet process phosphoric acid solution in order to neutralize the latter.

4. A process for preparing sodium metaphosphate according to claim 1, in which the filtrate from the step of separating the crystals of microcosmic salts is recycled and is added to the wet process phosphoric acid in order to neutralize the latter.

References Cited

UNITED STATES PATENTS 3,314,750   4/1967   Shen _____ 23—106

OTHER REFERENCES

Van Wazer, Phosphorus and Its Compounds, vol. 1, pp. 666–669 and 685, Interscience, New York, 1958.

Van Wazer, Phosphorus and Its Compounds, vol. II, pp. 1104–1105 and 1125–1127, Interscience Publishers, New York, 1961.

HERBERT T. CARTER, Primary Examiner

U.S. Cl. X.R.

23—107